United States Patent [19]
Jarnagin

[11] Patent Number: 5,899,319
[45] Date of Patent: May 4, 1999

[54] COUPLING AND PROCESS FOR SCREW CONVEYORS

[75] Inventor: Jack Jarnagin, Lake Charles, La.

[73] Assignee: Farmers Rice Milling Company, Inc., Lake Charles, La.

[21] Appl. No.: 08/728,097

[22] Filed: Oct. 9, 1996

[51] Int. Cl.$^6$ .................................................. B65G 33/32
[52] U.S. Cl. ........................ 198/666; 403/296; 403/299; 403/306
[58] Field of Search ............................ 198/666; 403/296, 403/299, 306

[56] References Cited

U.S. PATENT DOCUMENTS

| | | | |
|---|---|---|---|
| 248,193 | 10/1881 | Merriman | 248/193 |
| 2,214,177 | 9/1940 | Raybould | 287/127 |
| 2,588,901 | 3/1952 | Welkart | 198/666 |
| 2,815,852 | 12/1957 | Harrer | 198/213 |
| 3,368,271 | 2/1968 | Scheffler | 403/296 |
| 3,379,301 | 4/1968 | Kopaska | 198/213 |
| 3,630,341 | 12/1971 | Golden | 198/213 |
| 3,730,332 | 5/1973 | Benzon et al. | 198/213 |
| 4,691,818 | 9/1987 | Weber | 197/666 |
| 4,746,384 | 5/1988 | Tan | 198/666 |
| 4,852,719 | 8/1989 | Lapeyre | 198/666 |
| 4,958,720 | 9/1990 | Lapeyre et al. | 198/666 |

Primary Examiner—Joseph E. Valenza
Attorney, Agent, or Firm—Welsh & Katz, Ltd.; Thomas W. Tolpin

[57] ABSTRACT

An economical convenient coupling and process are provided to more safely secure screw conveyor sections together to enhance the longevity and wear of the screw conveyor, prevent accidents, and minimize downtime and repair. In the user-friendly coupling and process, internally threaded bushings are plug welded to the hollow core of the shafts and a double ended thread stud are screwed into the bushings along the axis of the shafts. The studs and bushings are hidden from view in the interior of the shafts and securely lock the screw conveyor sections together without the use of exterior, transverse or vertical bolts, nuts and locking pins, which can shear and damage downstream processing equipment and injure consumers and operating personnel.

18 Claims, 1 Drawing Sheet

COUPLING AND PROCESS FOR SCREW CONVEYORS

BACKGROUND OF THE INVENTION

This invention relates to screw conveyors, and more particularly, to couplings which connect screw conveyor sections.

Screw conveyors or auger conveyors are used to convey rice, grain and other raw food products and bulk material. Auger conveyors are used extensively to move grain horizontally. In a milling facility, auger conveyors can be used to unload raw product from incoming trucks and railcars, to unload and load storage silos, to feed milling and separation equipment, and to load processed and finished product.

Screw conveyors typically include a helical screw within a housing or trough. In operation, screw conveyors rotate about their longitudinal axis to convey material along the length of the helical screw. Screw conveyors are usually fabricated of metal and can be of fixed length and size. Screw conveyors have also been constructed of modular or segmented sections which can be assembled into a complete conveyor of a preferred length. Modular sections are useful to lengthen or shorten a conveyor so as to better fit the distance between pickup and delivery of the material being conveyed.

In the past, couplings for connecting together sections of a screw conveyor included a single, solid cylindrical shaft. The ends of the couplings were secured at each end by bolts that extend through the shafts and the couplings. In order to replace a worn coupling, the sections extending from that coupling to one of the ends of the conveyor had to be loosened and moved axially. This is very awkward and cumbersome. In a further effort to solve the problems, shafts and the couplings have both been modified in various ways to permit removal of the couplings without moving the shafts of the conveyor sections. This technique is very expensive.

The present widely used method of coupling and assembling sections of auger conveyors utilizes bolts and nuts. This causes many problems. The coupling bolts are constantly in shear and often split, chip, shear, wear through or otherwise fail from torsion, torque, tension, compression, shear or other dynamic forces causing pieces of the bolts or nuts to be conveyed and carried forward with grain or other conveyed food products. Metal chips, slivers and pieces of bolts and nuts contaminate food products making it unsafe for human consumption. Furthermore, pieces of coupling bolts and nuts which are conveyed into processing equipment can cause costly damage and extensive repair. In the event, all the bolts in a coupling fail, the coupling will open, the conveyor sections will separate, and production will cease as product can no longer be conveyed by a separated conveyor.

Even if coupling bolts are consistently maintained, i.e., changed prior to failure, wear becomes a factor of failure in the coupling shaft and/or the hollow pipe shaft of the auger itself. Constant torquing of the coupling bolt against the coupling bolt hole can cause the bolt hole to become increasingly enlarged and weaken the coupling shaft to cause absolute failure, i.e., shearing off of the bolted pieces. The auger conveyor then fails to transport product, causing immediate product backup upstream. If the coupling hole wear is seen at the hollow auger shaft, the section of auger in question should be replaced.

Besides bolts, other techniques and fastener arrangements have been suggested to connect screw conveyor sections, such as locking pins and tension springs, but they have not been generally successful.

It is, therefore, desirable to provide an improved coupling and process to connect screw conveyor sections, which overcome most, if not all of the preceding problems.

SUMMARY OF THE INVENTION

An improved coupling and process is provided to quickly and securely connect screw conveyor sections. Advantageously, the user-friendly screw conveyor coupling and process are convenient, dependable and effective. Furthermore, the efficient screw conveyor coupling and process are safer, economical and easy to install. Desirably, the durable screw conveyor coupling and process enhance the longevity and wear of the screw conveyor, help prevent accidents, and minimize downtime and repair.

The screw conveyor, which is also referred to as an auger conveyor, can comprise screw conveyor sections that are operatively connected and cooperate with each other to convey rice, grain, raw food products, processed food, cereal, granular material, semi-solid material, solid material, or other products and material. The screw conveyor is useful to convey the material horizontally or at an angle of inclination. The screw conveyor can be used to load and unload material from a storage facility, such as a truck, trailer, railway car, bin or storage silo, as well as to transport and feed (convey) the material to separation equipment, milling machines and other food processing equipment.

Shafts of the screw conveyor sections provide shaft sections which are operatively associated with each other and rotate in unison in the same direction. The shaft have end portions which are positioned in general alignment with each other. The shafts can have flexible portions and can comprise hollow shaft sections. Screw blades, such as spiral blades or helical blades can extend radially from the shafts to engage, convey and transport the material to the desired location.

Significantly, a special coupling assembly providing a superior screw conveyor coupling operatively connects and securely locks the screw conveyor sections together without bolts, nuts, locking pins, tension springs or other springs. Desirably, the coupling assembly comprises a removable coupling assembly to detachably couple the screw conveyor sections. The coupling assembly can have internally threaded members, preferably internally threaded bushings, which are securely welded to the end portions of the shaft. A stud assembly can be provided with externally threaded stud portions to threadedly engage and detachably connect the internal threaded members or bushing in order to securely couple and lock the screw conveyor sections together during operation of the conveyor. Preferably, the stud assembly comprises a double ended threaded stud with an intermediate bearing support section which is positioned between and integrally connected to the externally thread stud portions. By introducing a double ended, threaded stud and female bushing arrangement, the number of parts susceptible to failure is reduced dramatically. The overall dimensions of such an arrangement assembled can be precisely that of a solid coupling shaft (CEMA Standards).

The novel process of the invention provides a safer food conveying process which prevents bolts, nuts, locking pins, and springs and other fasteners from being conveyed with and contaminating comestible material, such as rice, grain or other food products intended for human consumption. Advantageously, the improved process helps avoid injury to consumers, operating personnel and other persons and helps prevent damage to downstream processing equipment. Desirably, the convenient process prevents shearing and failure of bolts, nuts, locking pins, springs and other fasteners in couplings of a screw conveyor or auger conveyor, which is transporting, carrying and conveying the comestible material (food). In order to couple the shaft sections together without the aforementioned bolts, nuts, locking pins, and springs, internally threaded members or bushings are securely welded to adjoining shaft sections of the conveyor. In the preferred method, the bushings are inserted in a hollow interior of pipes providing hollow shaft sections at a position closely adjacent and abutting against the internal walls of the pipes and the bushings are plug welded to the pipes or vice versa. Externally threaded stud portions, preferably externally threaded studs of a double ended thread stud, are positioned axially and most preferable coaxially along the axis of the shaft sections and screwed into the internally threaded bushings to securely lock the screw and shaft sections together.

A more detailed explanation of the invention is provided in the following description and appended claims taken in conjunction with the accompanying drawings.

DETAILED DESCRIPTION OF THE PREFERRED EMBODIMENT

Figure 1:
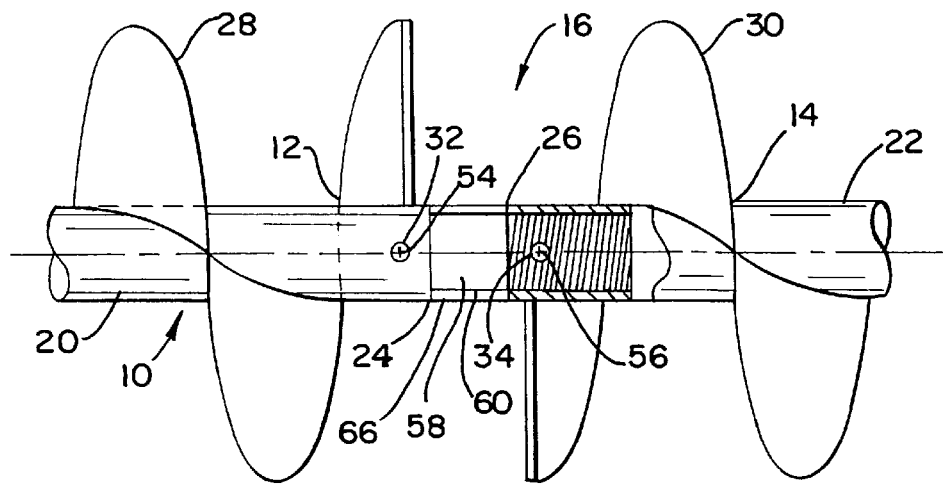
FIG. 1 is a fragmentary longitudinal view of screw conveyor sections connected by a coupling in accordance with principles of the present invention and showing a portion of the right shaft cut away for ease of understanding and clarity.

A modular screw conveyor 10 (FIG. 1) comprising an auger conveyor is provided to convey comestible material or food, such as rice, grain and other raw food products, cereal, and other bulk material. The screw conveyor has left and right screw conveyor sections 12 and 14, such as 10 to 12 foot screw conveyor sections, which are securely coupled and operatively connected to each other by a coupling assembly 16 without the use of bolts, nuts, locking pins, tension springs or other springs or other external, vertical, radial or transverse fasteners. The coupling assembly provides a removable screw conveyor coupling or screw coupling device to detachably couple and removably lock the screw conveyor sections together.

The screw conveyor can have a gear reducer or speed reducer and be driven by a motor, such as a 1 to 25 HP variable or fixed speed motor. The screw conveyor sections can be positioned in a tubular housing or trough, such as a flanged galvanized steel trough, and can be covered with shrouded or curved cover plates or with overflow, hinged or expanded metal covers.

In the preferred embodiment, the screw conveyor sections are of the same size, diameter and length and are fabricated of metal, such as stainless steel, carbon steel, iron or its alloys. In some circumstances, however, it may be desirable that some of the screw conveyor sections be of a different size, diameter and length, or that they be made of other types of metal or impact-resistant plastic. The parts and components of the screw conveyor coupling can be made of the same material as the screw conveyor sections or of different materials.

The illustrated screw conveyor sections include a pair of elongated pipes 20 and 22 (FIG. 1) which provide hollow shaft sections or shafts. The pipes (shafts) of the screw conveyor sections can be of the same outside diameter, inside diameter and length. The end portions 24 and 26 of the pipes are positioned in coaxial alignment and registration with each other. The right end portion 24 of the left shaft section 20 is positioned in proximity to and adjacent the left end portion 26 of the right shaft section 22 and vice versa. Shafts seal can be positioned about the end portions of the pipes.

Spiral or helical blades 28 and 30 provide flights (fighting) and screws. The flights can be securely connected to the pipes (shafts) by butt welding or lugs. Preferably, the flights are snugly fitted and extend spirally and radially outwardly of the pipes (shafts) to spirally convey comestible material (food) or other products. The left spiral blades 28 (FIG. 1) which extend from the left shaft section 20 (left pipe), can be of the same size and span and spiral (twist) in the same direction as the right spiral blades 30 which extend from the right shaft section 22 (right pipe). The spiral blades can comprise helicoid screws or helicoid flighting. The pitch of the screw can be equal to the screw diameter. If desired, the spiral blades can be tapered and have a variable pitch. Cone screws can also be used. Screw feeds can further be used with uniform or tapered diameter screws.

The flighting (screw blades) can be twisted counterclockwise (left hand screw) or clockwise (right hand screw) as viewed from the end of the screw. When the material flow is in the direction away from the end being viewed, a right hand screw will turn (rotate) counterclockwise and a left hand screw will turn (rotate) clockwise. In other words, right hand screws pull material toward the end which is being rotated in a clockwise direction and is pushed towards the end that is rotating counterclockwise. Material flow in left hand screws is opposite the material flow in right hand screws. Typically, the material is carried on one face of the conveyor flighting which is transporting the material in one direction.

The end portions of the shaft sections have two or more holes or radial openings which provide left and right sets of plug-welding radial apertures 32 and 34, respectively. The plug-welding apertures can be positioned perpendicular or at right angles to each other or can be positioned in alignment with each other.

The coupling assembly (coupler) 16 securely locks and detachably connects the end portions of the shaft section in coaxial alignment and registration with each other. The coupling assembly has internally threaded members which provide female bushings 36 and 38 (FIG. 2) and has a double ended threaded stud 40. The bushing can comprise annular, cylindrical or barrel-shaped bushings or shells. The left and right internally threaded bushings 36 and 38 can be of the same diameter, length and size. Each of the bushings have an internally threaded inner surface 42 and 44 to receive and threadedly engage one of the ends comprising the externally threaded stud portions 46 and 48, of the double ended externally threaded stud 40. The left and right bushings have left and right outer surfaces 50 and 52 with a maximum outside diameter which is slightly smaller (less) than the inside diameter of the end portions of the left and right shaft sections (pipes). This permits the bushings to be inserted (slide) into the hollow interior of the pipes and be positioned against and snugly engage the inner surfaces providing the interior wall and inside diameter of the pipes. The left and right bushings preferably have an axial length which is greater than maximum span and distance between the plug-welding apertures at the ends (end portions) of the left and right shaft sections, respectively, to facilitate better welds.

The plug-welding apertures at the end portions of the shaft sections cooperate with the bushings' outer surfaces within the interior of the hollow shaft sections to form and provide left and right plug-welding cavities or craters, respectively. Plug welds 54 and 56 (FIG. 1) substantially fill the plug-welding cavities and firmly attach and securely weld the bushings' outer surfaces to the end portions 24 and 26 of the pipes about the plug-welding apertures 32 and 34. The plug welds securely connect and fixedly weld the bushings to the left and right shaft sections (pipes) 20 and 22. The left and right plug welds 54 and 56 have a much greater shear strength and much better resistance to torsion (twist), torque and dynamic forces than do conventional bolts, nuts, locking pins and springs. For example, plug welds secured in the preceding manner have 2–3 times the sheer strength of conventional bolts and nuts.

Figure 2:
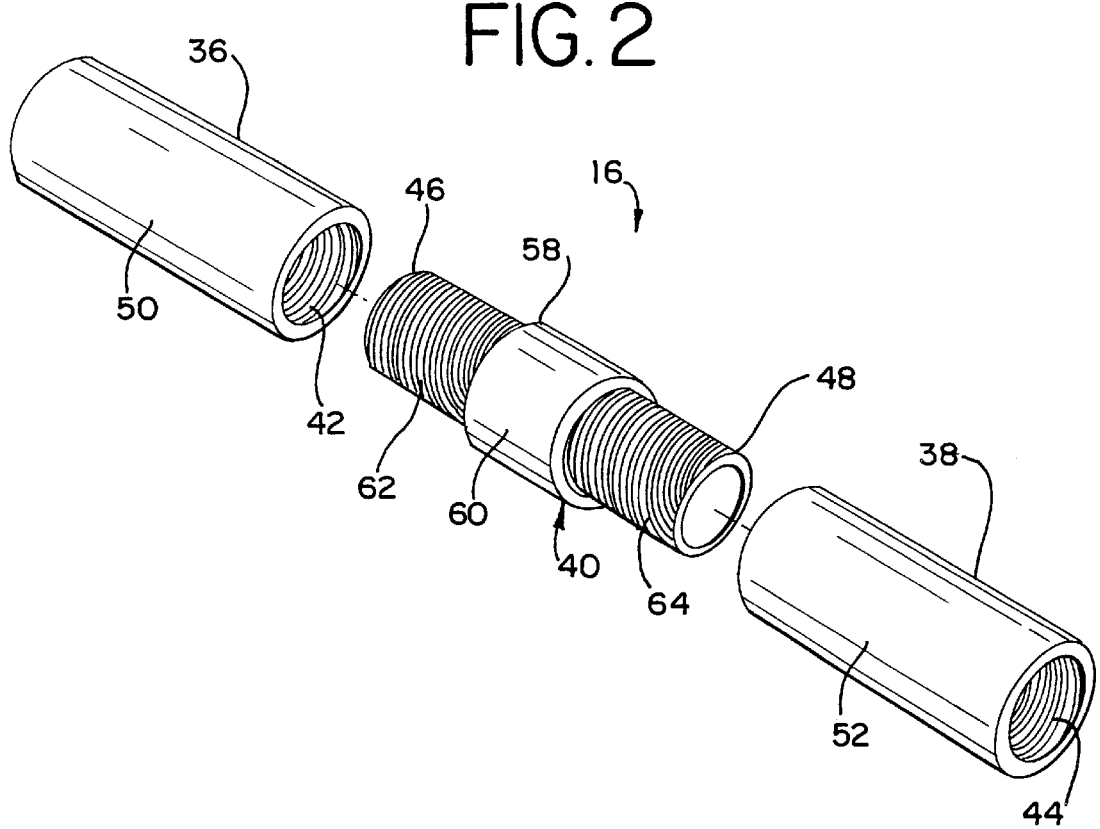
FIG. 2 is an exploded, assembly perspective view of the double ended threaded stud and internally threaded female bushings of the screw conveyor coupling.

As best shown in FIG. 2, the double ended threaded stud 40 has an intermediate bearing-supporting section 58 with an outer bearing-supporting surface 60. The externally threaded studs or stud portions 46 and 48 (FIG. 2) extend integrally and axially outwardly of the bearing-supporting section. The left and right studs 46 and 48 can be of a similar diameter, length and size and can have left and right external threads 62 and 64. The external threads at the opposite ends of the double ended threaded studs can turn or twist in opposite directions and be left or right handed to matingly engage and threadedly connect the internally threaded surfaces of the left and right female bushings. The threads of the studs and bushings can be ACME threads. The threads interlockingly connect and firmly secure the studs to the bushing during operation of the conveyor and rotation of the shaft sections and spiral blades in the forward axial direction of movement of the comestible material or other products being conveyed. The studs or stud portions can be about the same axial length as the bushings.

In the preferred embodiment, a bearing 66 (FIG. 1) is seated on and about the bearing-supporting surface of the double ended threaded stud. The bearing is positioned and spaced between the spiral blades between and in proximity to the end portions ends) of the left and right shaft sections.

In order to install the screw coupling device and couple (connect) the screw conveyor sections, assembly of both female bushings to the body of the double ended, threaded stud is required. The assembled screw coupling can then inserted into the hollow pipe shafts (shaft sections) of the auger (screw conveyor). The inner edge of the female bushings are preferably aligned flush to the respective outer edges of the hollow pipe shafts of the auger. The female bushings can then be plug welded to the hollow pipe shaft through standard, jig drilled holes, e.g. 4 holes (two at right angles). Alternatively, threaded female bushings can be inserted into the hollow pipe shaft of the auger without the double ended, threaded stud in place, allowing for future assembly. Other procedures can be used.

In order to disengage and remove one or more shaft sections to shorten or disassemble the screw conveyor, the double ended threaded stud is manually rotated in the unscrewing direction and detached (unscrewed) from the internally threaded bushing. This design and arrangement accommodates quick disassembly and interchangability with other shaft sections. Advantageously, screw conveyor sections can be installed and/or detached with the coupling of this invention by one person in less than about 20 minutes. In contrast, conventional bolt couplings take two persons approximately an hour (three times longer) to pull the bolts and remove and install screw conveyor sections.

Screw conveyors with coupling in accordance with the invention can be constructed of various sizes, such as: pipes (shafts) with an outside diameter (O.D.) Of 1⅝ to 4¼ inches an inside diameter of 1¼ of 4 inches and a length of 9 ft. 10½ inches to 11 ft. 9 inches, with 0.5 to 0.86 flights per foot, a flight thickness of 10 gauge to ½ inch, a screw diameter of 4 inches to 24 inches, a bearing length of 1½ inch to 4 inches. The coupling can be constructed of solid durable stress-resistant steel such as A1SI 1144 steel or SAE 1144 steel, or other metal, and can have coarse ACME threads, both ends unidirectional.

Many different types of materials can be conveyed by the screw conveyor, such as: alfalfa meal, barley, bone meal, coffee beans, corn meal, cotton seed, cryolite, flours, grains, hops, lead oxide, lime, malt, mica, dried or powdered milk, mixed feeds, mustard seed, oats paper pulp peanuts, resin, rice, salt, shellac, powder, soda ash, soybean meal, sugar, sunflower seeds, tobacco, wheat, raw food products, processed food, granular material, semi-solid material and solid material.

Among the many advantages of the novel screw conveyor coupling and process are:
 1. Outstanding performance.
 2. Superior strength.
 3. Greater wear.
 4. Less repair and downtime.
 5. Easier to install.
 6. Faster disassembly.
 7. Economical.
 8. Dependable.
 9. Efficient.
 10. Effective.

Although embodiments of the invention have been shown and described, it is to be understood that various modifications and substitutions, as well as rearrangements of parts, components, and process steps, can be made by those skilled in the art without departing from the novel spirit and scope of this invention.

What is claimed is:
1. A screw conveyor, comprising:
 screw conveyor sections operatively connected and cooperating with each other for conveying material selected from the group consisting of rice, grain, raw food products, processed food, cereal, granular material, semi-solid material, and solid material; said screw conveyor sections including
  shafts operatively associated with each other for rotation in unison in the same direction, said shafts having end portions positioned in general alignment with each other, and said shafts defining plug-welding apertures in proximity to the end portions of said shafts;
  screw blades providing flights extending radially from said shafts for engaging and conveying said material; and
  a removable coupling assembly for detachably connecting said screw conveyor sections together in the absence of bolts, nuts, locking pins, and springs said coupling assembly comprising
   a pair of internally threaded bushings positioned in said shafts of said screw conveyor sections:
   plug welds substantially filling said plug-welding, apertures for securely connecting said internally bushings to said shafts:
   a double ended threaded stud having externally threaded studs extending axially from an intermediate bearing supporting section for matingly engaging said internally threaded bushings in said shafts of said screw conveyor sections, and a bearing seated on and positioned about said intermediate bearing supporting section of said double ended threaded stud.

2. A screw conveyor in accordance with claim 1 wherein:

said screw conveyor comprises an auger conveyor; and said internally threaded bushings are plug welded to said shafts of said screw conveyor.

3. A screw conveyor in accordance with claim 1 wherein said shafts have flexible portions.

4. A screw conveyor in accordance with claim 1 wherein said shafts comprise hollow shaft sections.

5. A screw conveyor in accordance with claim 1 wherein said blades comprise spiral blades.

6. A screw conveyor in accordance with claim 1 wherein said blades comprise helical blades.

7. A screw conveyor, comprising:

a pair of elongated pipes comprising and providing hollow shaft sections with portions positioned in coaxial alignment and registration with each other, spiral blades providing flights securely connected to and extending spirally outwardly from said shaft sections for spirally conveying comestible material or other products, said shaft sections having an outside diameter and an inside diameter, said shaft sections including a left hollow shaft section and a right hollow shaft section, said spiral blades comprising left spiral blades and right spiral blades, said left spiral blades extending from said left shaft section, said right spiral blades extending from said right shaft section, said left spiral blades having a maximum span substantially similar to the outside diameter of said right shaft section, said left shaft section having an inside diameter substantially similar to the inside diameter of said right shaft section, said left shaft section having a right end portion positioned in proximity to said right shaft section, said right end portion of said left shaft section defining a left set of plug-welding radial apertures, said right shaft section having a left end portion positioned in proximity to said left shaft section, and said left end portion of said right shaft section having a right set of plug-welding radially apertures;

a coupling assembly for securely detachably connecting said end portions of said shaft sections in coaxial alignment and registration with each other, said coupling assembly comprising a pair of internally threaded bushings comprising hollow elongated members with a cylindrical outer surface having an outside diameter and an internally threaded inner surface, said bushings included a left bushing and a right bushing, said left bushing having a maximum outside diameter slightly less than the inside diameter of the right end portion of the left shaft section to slidably engage and be inserted into said right end portion of said left shaft section, said left bushing having an axial length greater than the distance between the plug-welding apertures of said right end portion of said left shaft section, said right bushing having a maximum outside diameter slightly less than the inside maximum diameter of the left end portion of the right shaft section to slidably engage and be inserted into said left end portion of said right shaft section, said right bushing having an axial length greater than the distance between the plug-welding apertures of said left end portion of said right shaft section;

said plug-welding apertures of said right end portion of said left shaft section cooperating with said outer surface of said left bushing to form left plug-welding cavities, and said plug-welding apertures of said left end portion of said right shaft section cooperating with said outer surface of said right bushing to form right plug-welding cavities;

plug welds for securely connecting said bushings to said shaft section including left plug welds and right plug welds, said left plug welds substantially filing said left plug-welding cavities and firmly attached to said outer surface of said left bushing and to said right end portion of said left shaft section about said plug-welding apertures on said right end portion, and said right plug welds substantially filling said right plug-welding cavities and firmly attached to said outer surface of said right bushing and to said left end portion of said right shaft section about said plug-welding apertures on said left end portion;

a double ended threaded stud having a central intermediate bearing-supporting section with an outer bearing—supporting surface, said double ended threaded stud having externally threaded studs extending axially outwardly of said central intermediate bearing-supporting section, said externally threaded studs including a left stud and a right stud, said left stud having external threads for matingly engaging said internally—threaded surface of said left bushing to interlockingly connect said left stud to said left bushing during rotation of said left shaft section and spiral blades in the forward axial direction of movement of said comestible material or other products, said right stud with having external threads for matingly engaging said internally—threaded surface of said right bushing to interlockingly connect said right stud to said right bushing during rotation of said right shaft section and spiral blades in the forward axial direction of movement of said comestible material or other products, and said double ended threaded stud being manually rotatable in an opposite direction for removing said studs from said bushing to detach said shaft sections from said double ended threaded stud so as to accommodate quick disassembly and interchange with other shaft sections; and a bearing seated on and about said bearing—supporting surface of said double ended threaded stud, said bearing positioned and spaced between the left spiral blades in proximity to the right end portion of said left shaft section and the right spiral blades in proximity to the left end portion of said right shaft section.

8. A screw conveyor in accordance with claim 7 wherein said shaft sections, spiral blades and double ended threaded stud are constructed of food grade metal.

9. A screw conveyor in accordance with claim 7 wherein said bushings comprise annular cylindrical shells.

10. A screw conveyor in accordance with claim 7 wherein said studs are about the same length as said bushings.

11. A screw conveyor in accordance with claim 7 wherein said outer bearing supporting surface of said double ended threaded stud is in coaxial alignment with said outer surfaces of said bushings, and the outside diameters of said bushings are similar to the outside diameter of said outer bearing - supporting surface of said double ended threaded stud.

12. A food conveying process, comprising the steps of:

preventing bolts, nuts, locking pins and springs from being conveyed with and contaminating comestible material comprising rice, grain or other food products intended for human consumption, so as to avoid injuring persons and damaging downstream processing equipment with said contaminated comestible material, by preventing shearing and failure of bolts, nuts, locking pins and springs, on a conveyor transporting, carrying and conveying said comestible material, said conveyor being selected from the group consisting of a screw conveyor and an auger conveyor;

coupling shaft sections of said conveyor without the use of bolts, nuts, locking pins and springs, by welding internally threaded bushings to adjoining shaft sections of said conveyor;

securely locking said shaft sections of said conveyor together by screwing an externally threaded stud of a double ended threaded stud to one of said internally threaded bushings welded to one of said adjoining shaft sections of said conveyor and screwing another externally threaded stud of said double ended stud to the other internally threaded bushing welded to the other of said adjoining shaft sections of said conveyor; and placing a bearing about an intermediate bearing supporting section of said double ended threaded stud.

13. A process in accordance with claim 12 including unlocking and detaching said shaft sections by unscrewing said studs from said internally threaded bushings welded to said adjoining shaft sections of said conveyor.

14. A process in accordance with claim 12 wherein said comestible material is conveyed substantially horizontally by said conveyor.

15. A process in accordance with claim 12 including unloading comestible material with said conveyor from a storage facility selected from the group consisting of a truck, trailer, railway car, bin, and storage silo.

16. A process in accordance with claim 12 including transporting and feeding comestible material with said conveyor to a facility selected from the group consisting of a storage silo, a bin, milling equipment, separation equipment, food processing equipment, a truck, a trailer, and a railway car.

17. A process in accordance with claim 12 wherein said shaft sections comprise pipes providing hollow shaft sections with plug-welding apertures;

said internally threaded bushings are inserted into the hollow interior of said hollow shaft sections and are positioned closely adjacent internal walls of said pipes before said welding; and said welding comprises substantially filing said plug-welding apertures with plus welds for securely connecting said internally threaded bushings to said shaft sections.

18. A process in accordance with claim 17 wherein said welding comprises plug welding said internally threaded bushings to said pipes of said conveyor.

* * * * *